United States Patent Office 3,222,304
Patented Dec. 7, 1965

3,222,304
EXPANDABLE POLYETHYLENE
Alvin R. Ingram, Murrysville, Pa., assignor to Koppers Company, Inc., a corporation of Delaware
No Drawing. Filed Nov. 15, 1962, Ser. No. 238,031
4 Claims. (Cl. 260—2.5)

This application is a continuation-in-part of my copending application Serial No. 5,666, filed February 1, 1960, and now abandoned.

This invention relates to a process for the production of foamed polyethylene. In one specific aspect it relates to the molding of foamed polyethylene articles having a cross section of uniformly small cells.

Small celled polyethylene foamed material is useful in applications such as wire coating, athletic pads, badminton shuttlecocks, life jackets, insulation, toys and novelties.

Heretofore foamed polyethylene was made by one of two processes. One process involved forcing a gas under pressure into molten polyethylene and extruding the gas-containing polymer. The other process involves intimately incorporating in the polyethylene a gas releasing compound which liberates the gas on heating. The polyethylene is then heated in a mold at a temperature high enough to liberate the gas, and form an article having a cellular or foamed structure.

The former process has an inherent deficiency in that it is limited to shapes which can be produced by extrusion. The chemical gas releasing process, although capable of being used to produce a foam for some purposes, has not been entirely successful in providing foams of low density. The blowing agents used have not released the gas under conditions whereby a foam having uniformly small cell structure is obtained. Further deficiencies in many of the foams produced by chemical blowing agents are that they tend to stick to the mold and aften shrink or are otherwise distorted after removal from the mold.

It has now been found possible to provide for the first time foams of both linear polyethylene and branched polyethylene of uniformly small cell size having a density as low as 10 pounds per cubic foot, and which neither stick to the mold, nor significantly shrink after removal from the mold, by incorporating a novel expansion complex in the polymer.

In accordance with the invention, I have discovered a method of making a foamed material having substantially uniform cells of average size of 5-20 mils by the steps of intimately incorporating within polyethylene 1-5 parts by weight of the polyethylene of a nitrogen releasing blowing agent selected from the group consisting of dinitrosopentamethylenetetramine, p,p'-oxybis(benzenesulfonylhydrazide), and azodicarbonamide, and 0.1-4 parts by weight of the polyethylene of a blowing agent adjunct selected from the group consisting of glyceryl monostearate, propyleneglycol monostearate, ethyleneglycol monostearate, diethyleneglycol monostearate, polyethyleneglycol monostearate and polydimethylsiloxane, molding the expandable polymer composition at a temperature at least as high as the softening point of the polyethylene and the nitrogen generating temperature of the blowing agent, and maintaining the temperature for a time sufficient to cause expansion of cells to the desired size. The process is characterized by the absence of any appreciable cross-linking of the polyethylene with the blowing agent; the absence of cross-linking being shown by the fact that the resulting foamed material is soluble in xylene at 95° C.

The novel expansion complex is comprised of a blowing agent adjunct and a nitrogen blowing agent, i.e. a compound which at elevated temperatures releases free nitrogen.

The blowing agent adjunct is typically the reaction product of a monoester of a fatty acid and a polyhydric alcohol. Useful blowing agent adjuncts are glyceryl monostearate, diethyleneglycol monostearate and polyethyleneglycol monostearate, ethyleneglycol monostearate, propyleneglycol monostearate, and hydrophobic silicones, such as poly-dimethylsiloxane oils. The blowing agent adjunct is advantageously present in an amount of from about 0.1–4 parts per 100 parts of polyethylene. The particular amount used will vary with the amount of blowing agent used.

The nitrogen releasing blowing agent must have a decomposition temperature above the crystal melting point of the polyethylene, e.g. about 120–130° C., and must not cause any appreciable cross-linking of the polyethylene. Suitable commercially available nitrogen releasing blowing agents are dinitrosopentamethylenetetramine, p,p'-oxybis(benzenesulfonylhydrazide) and azodicarbonamide. The amount of blowing agent required depends upon the density of foam to be prepared. Generally, about 1–5 parts of blowing agent per 100 parts of polyethylene must be used. If less than one part is used the cell size becomes excessive for the lower range of foam density set forth below. While more than 5 parts are not harmful, an excess would be uneconomical. The workable range of foam density of the present invention has a lower limit of about 10 pounds per cubic foot. Below about 10 pounds per cubic foot, the foam was nonuniform, the cells became too large and the foam began to collapse.

The blowing agent complex is mixed with the polyethylene in any conventional manner, such as in a Banbury or Bolling mixer. The order of addition of the blowing agent and blowing agent adjunct to the polyethylene is a matter of choice. However, care must be taken to conduct the mixing at a temperature below the decomposition temperature of the nitrogen blowing agent after it has been added to the mixture.

The mixture of polyethylene and expanding complex may be molded in a number of ways, provided the molding temperature is sufficient to release the nitrogen of the blowing agent. Excellent results have been obtained in compression molding and rotational molding.

The molding temperature varies with the nitrogen releasing blowing agent, and is generally in a range of from 240–385° F. For example, p,p'-oxybis(benzenesulfonylhydrazide) starts to foam polyethylene at a temperature of about 250–270° F., whereas azodicarbonamide starts to foam polyethylene at a temperature of about 350–370° F.

The invention is further illustrated by the following examples.

EXAMPLE I

*A. Preparation of the expandable polyethylene*

A Bolling mixer of 30-pound capacity was charged with 25 pounds of polyethylene pellets. The polymer density was 0.917 g./cc., the melt index was 2.6 according to ASTM Test Method D–1238–52T. The mixer was started and a ram pressure of 34 p.s.i.g. was applied. The polyethylene reached a temperature of 240° F. after 2 minutes. The ram was raised and one pound of azodicarbonamide was added to the mixer, and mixing continued for one minute. Then one-half pound of glyceryl monostearate was added, and a ram pressure of 34 p.s.i.g. again applied until a temperature of 300° F. was reached. The charge was removed from the mixer, extruded at 280° F. and chopped into cylindrical pellets of $\frac{1}{16}$-inch length and $\frac{1}{8}$-inch diameter.

*B. Molding of the expandable polyethylene*

A portion of the expandable polyethylene prepared in Example I was compression molded by adding 1.3 gram charged to door-stop bumper molds (round-bottom cylindrical molds of one-inch diameter and one-inch length). The lip of the mold was radially grooved to permit venting. The mold was tightly closed and then heated gradually for eighteen minutes to a temperature of 370–380° F. The temperature was maintained for five minutes, followed by gradual cooling to 100° F. over an eight minute period. The foamed objects were easily removed from the mold without any distortions. They were found to have a density of 13.5 pounds per cubic foot and the interior was composed of uniformly distributed cells of 5–15 mils diameter.

EXAMPLE II

A Bolling mixer of 30-pound capacity was charged with 25 pounds of the polyethylene pellets used in Example I. The mixer was started and a ram pressure of 34 p.s.i.g. was applied. The polyethylene reached a temperature of 240° F. after 2 minutes. One-half pound of glyceryl monostearate was added to the mixer and a ram pressure of 34 p.s.i.g. was applied until the temperature reached 280° F. The temperature was lowered to 240° F. and one pound of p,p'-oxybis(benzenesulfonlyhydrazide) was added. The mixing continued for one minute, keeping the temperature at 240° F. Expandable polyethylene was then removed from the mixer, extruded at 240° F. and chopped into cylindrical pellets of approximately ⅛-inch diameter and ¹⁄₁₆-inch length. After molding the product according to the general procedure described in Example IB at lower temperature: 5 minutes from 75° F. to 275° F.; 5 minutes at 275° F. to 285° F.; and 2.5 minutes to 100° F., the product was found to have uniformly distributed cells of 5–15 mils diameter.

EXAMPLE III

A series of tests were run using various blowing agent adjuncts. The procedure of Example IA was followed except that 0.5 pound of the various blowing agent adjuncts noted in Table I below were substituted for the glyceryl monostearate. After molding in accordance with the procedure described in Example IB, the following results were obtained.

TABLE I

Blowing agent adjunct:             Cell diameters, mils
  Ethyleneglycol monostearate _____ 5–15
  Propyleneglycol monostearate _____ 5–20
  Polydimethylsiloxane oil _____ 5–10

EXAMPLE IV

A series of expandable polyethylenes was prepared following the general procedure of Example I and expandable polyethylenes were compression molded as described in EXAMPLE IB. The amounts of glyceryl monostearate and azodicarbonamide used and the characteristics of the corresponding foamed product are indicated in Table II below.

EXAMPLE V

A 20-gram portion of an expandable polyethylene consisting of 2 parts glyceryl monostearate, 4 parts azodicarbonamide and 94 parts polyethylene pellets was charged into one hemisphere of a hollow aluminum mold of 3-inch diameter (230-ml. volume). The other hemisphere was clamped thereon and polyethylene foam was produced by rotational casting in the manner ordinarily used for polyvinyl chloride plastisols. The chamber was not gas-tight, as evidenced by a slow stream of bubbles from the mold when the mold was immersed in warm water during the expansion phase.

The rotational casting machine used was manufactured by the Akron Presform Mold Co. of Cuyahoga Falls, Ohio, and is designated as a "Single Spindle Plastisol Rotational Molding Machine." The mold was rotated in a compound manner, about two axes. At the same time the mold was heated in an air-circulating oven at a maximum temperature of 700° F. Heating of the mold was continued while the polyethylene pellets underwent the following: (a) being forced centrifugally and sticking to the hot surface of the mold and thence to each other; (b) softening and smearing onto the surface of the mold; (c) expanding inwardly and peripherally to give a wall of foam ⅜-inch thick. The mold was cooled by tap water and opened. The resulting hollow spherical ball had an overall density of 5.4 pounds per cubic foot, a wall density of 13.6 pounds per cubic foot and the cell diameters ranged from 5 to 20 mils.

EXAMPLE VI

To show the effect of omitting either of the components of the expansion complex, Example IA was repeated, except that glyceryl monostearate was not added to the mixture. An attempt was then made to mold the material according to the procedure of Example IB. The resulting material stuck to the sides of the mold, exhibited irregular and large cell structures, and contained a formation of fiber-like material in the center of the mold.

Example IA was again repeated except that azodicarbonamide was not added to the mixture. This material was then molded according to the procedure of Example IB. The resulting product had a solid cross section with no evidence of foam.

These experiments show that when either component of the expansion complex is omitted, the product is useless for molding into expanded polyethylene articles.

EXAMPLE VII

Flakes of ⅛″ x ⅛″ x ¹⁄₁₆″ dimension were cut from a sheet of linear polyethylene having a density of 0.955, a melt index of 6.0 and containing 4 parts of p,p'-oxybis-(benzenesulfonylhydrazide) and 2 parts of glyceryl monostearate. The blend was prepared on a two-roll mill: the front roll at 320° F., the back roll at 122° F. No sig-

TABLE II

| Sample No. | Melt Index of Polyethylene of 0.917 g./cc. Density | Glyceryl Monostearate Parts per Hundred | Azodicarbonamide, Parts per Hundred | Expansion temperature, °F. | Characteristics of 13.5 lb./ft.³ Foam ||||
|---|---|---|---|---|---|---|---|---|
| | | | | | Sticking to Mold | Cell Diameter Mils (0.001″) | Core Hole (Inches) | Surface |
| 1 | a 2.6 | 2.0 | 4 | 372–390 | None | 10–20 | None | Pin Holes. |
| 2 | a 2.6 | 1.0 | 4 | 372–390 | do | 5–25 | ⅛ | Do. |
| 3 | a 2.6 | 0.1 | 4 | 372–390 | Slight | 5–30 | ¼ | Do. |
| 4 | b 0.25 | 2.0 | 4 | 372–390 | None | 4–10 | None | Smooth. |
| 5 | b 0.25 | 1.0 | 4 | 372–390 | do | 5–15 | None | Do. |
| 6 | b 0.25 | 0.1 | 4 | 372–390 | Slight | 5–20 | None | Do. |
| 7 | b 0.25 | 2.0 | 2 | 372–393 | do | 5–10 | None | Do. |
| 8 | b 0.25 | 1.0 | 2 | 372–396 | do | 5–20 | None | Do. |
| 9 | b 0.25 | 0.1 | 2 | 372–394 | do | 10–25 | None | Do. | a Film-extrusion grade polyethylene.
b Wire coating grade polyethylene.

nificant decomposition of the blowing agent occurred, in spite of the fact that one roll was above the decomposition temperature of the blowing agent. These flakes were heated in closed vented molds for 13 minutes to 275° F. and then 10 minutes at 275–300° F. Upon removal from the mold the articles (1.129-inch diameter by 1.0-inch long cylinders) were found to be hard, tough foams of 13.5 pounds per cubic foot density having a uniform cell structure of 5–15 mils but they also had a ⅛" hole in the center.

EXAMPLE VIII

A section of foam polyethylene prepared by the method set forth in Example I was placed in a beaker containing xylene at a temperature of 95° C. It was observed that the foamed polyethylene rapidly dissolved and after a short time had disappeared completely; this indicates that the nitrogen releasing blowing agent does not act to cross-link the polyethylene.

I claim:

1. A method of making a foamed material consisting essentially of polyethylene having substantially uniform cells of average size of 5–20 mils comprising the steps of:
   (1) intimately incorporating within polyethylene
       (a) 1–5 parts by weight of said polyethylene of a nitrogen releasing blowing agent selected from the group consisting of dinitrosopentamethylenetetramine, p,p' - oxybis(benzenesulfonylhydrazide), and azodicarbonamide, and
       (b) 0.1–4 parts by weight of said polyethylene of a blowing agent adjunct selected from the group consisting of glyceryl monostearate, propyleneglycol monostearate, ethyleneglycol monostearate, diethyleneglycol monostearate, polyethyleneglycol monostearate and polydimethylsiloxane,
   (2) molding the expandable polymer composition at a temperature at least as high as the softening point of said polyethylene and the nitrogen generating temperature of the blowing agent,
   (3) maintaining the temperature for a time sufficient to cause expansion of cells to the desired size, and
   (4) said process being characterized by the absence of any appreciable cross-linking of said polyethylene with said blowing agent, whereby said resulting foamed material is soluble in xylene at 95° C.

2. A method according to claim 1, wherein said nitrogen releasing blowing agent is azodicarbonamide and said blowing agent adjunct is glyceryl monostearate.

3. A composition foamable on heating to give a material having substantially uniform cells, said composition
   (1) consisting essentially of a mixture of:
       (a) 100 parts by weight of polyethylene,
       (b) 1–5 parts by weight of a nitrogen releasing blowing agent selected from the group consisting of dinitrosopentamethylenetetramine, p,p' - oxybis(benzenesulfonylhydrazide), and azodicarbonamide, and
       (c) 0.1–4 parts by weight of a blowing agent adjunct selected from the group consisting of glyceryl monostearate, propyleneglycol monostearate, ethyleneglycol monostearate, diethyleneglycol monostearate, polyethyleneglycol monostearate and polydimethylsiloxane, and
   (2) having the characteristic of forming a foamed structure, when heated, that
       (a) has an average size of 5–20 mils, and
       (b) is soluble in xylene at 95° C.

4. A composition according to claim 3, wherein said nitrogen releasing blowing agent is azodicarbonamide and said blowing agent adjunct is glyceryl monostearate.

References Cited by the Examiner

UNITED STATES PATENTS

| | | | |
|---|---|---|---|
| 2,462,331 | 2/1949 | Myers | 260—31.6 |
| 2,532,243 | 11/1950 | Ott | 260—2.5 |
| 2,666,036 | 1/1954 | Schwencke | 260—2.5 |
| 2,849,028 | 8/1958 | Clark | 260—2.5 |
| 2,857,341 | 10/1958 | Coldwell et al. | 260—2.5 |
| 2,927,904 | 3/1960 | Cooper | 260—2.5 |
| 2,928,130 | 3/1960 | Gray | 260—2.5 |
| 3,017,371 | 1/1962 | Hohenberg et al. | 260—2.5 |

SAMUEL H. BLECH, *Primary Examiner.*

JAMES A. SEIDLECK, MURRAY TILLMAN,
*Examiners.*